(12) United States Patent
Aigner et al.

(10) Patent No.: US 7,759,603 B2
(45) Date of Patent: Jul. 20, 2010

(54) METHOD AND DEVICE FOR COMBINED LASER-ARC WELDING WITH CONTROL OF LASER UNIT ACCORDING TO WELDING TORCH

(75) Inventors: Gerald Aigner, Taufkirchen (AT); Heinz Hackl, Ried/Traunkreis (AT)

(73) Assignee: Fronius International GmbH, Pettenbach (AT)

( * ) Notice: Subject to any disclaimer, the term of this patent is extended or adjusted under 35 U.S.C. 154(b) by 307 days.

(21) Appl. No.: 11/791,375

(22) PCT Filed: Dec. 15, 2005

(86) PCT No.: PCT/AT2005/000504
§ 371 (c)(1),
(2), (4) Date: May 23, 2007

(87) PCT Pub. No.: WO2006/063374
PCT Pub. Date: Jun. 22, 2006

(65) Prior Publication Data
US 2008/0128395 A1    Jun. 5, 2008

(30) Foreign Application Priority Data
Dec. 15, 2004    (AT)    ................... A 2102/2004

(51) Int. Cl.
*B23K 26/20*    (2006.01)
*B23K 9/095*    (2006.01)

(52) U.S. Cl. ...................... 219/121.63; 219/121.64; 219/130.5; 219/137 R

(58) Field of Classification Search ............ 219/121.62, 219/121.63, 121.64, 130.5, 130.51, 137 R
See application file for complete search history.

(56) References Cited

U.S. PATENT DOCUMENTS

| | | | | |
|---|---|---|---|---|
| 4,507,540 A | * | 3/1985 | Hamasaki | ............... 219/121.64 |
| 5,674,415 A | * | 10/1997 | Leong et al. | ........... 219/121.64 |
| 5,866,870 A | | 2/1999 | Walduck et al. | |
| 6,596,969 B1 | * | 7/2003 | Sakurai et al. | ......... 219/121.64 |
| 6,664,507 B2 | | 12/2003 | Akaba et al. | |
| 6,844,521 B2 | | 1/2005 | Staufer et al. | |

(Continued)

FOREIGN PATENT DOCUMENTS

DE    196 00 627 C1    5/1997

(Continued)

OTHER PUBLICATIONS

Computer based translation of Japan Patent 2005-224,810-A, created Mar. 30, 2009.*

(Continued)

*Primary Examiner*—Geoffrey S Evans
(74) *Attorney, Agent, or Firm*—Collard & Roe, P.C.

(57) ABSTRACT

A method for combined laser-arc welding and a device for combined laser-arc welding uses a device for controlling a laser unit for producing a laser beam according to a welding torch for producing an arc in order to optimize the energy balance and to adapt the combined laser-arc welding process to the respective conditions. The device for controlling the laser unit is connected with a detector that detects the arc voltage or the arc current. The laser output is adapted to the arc output and is controlled by a closed control circuit.

12 Claims, 6 Drawing Sheets

U.S. PATENT DOCUMENTS

| | | | |
|---|---|---|---|
| 7,107,118 B2 * | 9/2006 | Orozco et al. | 700/166 |
| 2004/0026388 A1 * | 2/2004 | Staufer et al. | 219/121.63 |
| 2005/0284853 A1 | 12/2005 | Takahashi et al. | |

FOREIGN PATENT DOCUMENTS

| | | | |
|---|---|---|---|
| EP | 1 199 128 A1 | | 4/2002 |
| EP | 1 609 557 A | | 12/2005 |
| JP | 2000 107880 A | | 4/2000 |
| JP | 2002103075 A | | 4/2002 |
| JP | 2002113588 A | | 4/2002 |
| JP | 2002-248571 A | * | 9/2002 |
| JP | 2002-346777 A | * | 12/2002 |
| JP | 2003-25081 A | * | 1/2003 |
| JP | 2003 290947 A | | 10/2003 |
| JP | 2004 009061 A | | 1/2004 |
| JP | 2004017059 A | | 1/2004 |
| JP | 2004-202546 A | * | 7/2004 |
| JP | 2005 059079 A | | 3/2005 |
| JP | 2005 224810 A | | 8/2005 |
| WO | WO 02/40211 A1 | | 5/2002 |

OTHER PUBLICATIONS

Machine translation of Japan Patent document No. 2002-248,571, Nov. 2009.*

Machine translation of Japan Patent document No. 2002-346,777, Nov. 2009.*

Machine translation of Japan Patent document No. 2004-202,546, Nov. 2009.*

International Search Report.

* cited by examiner

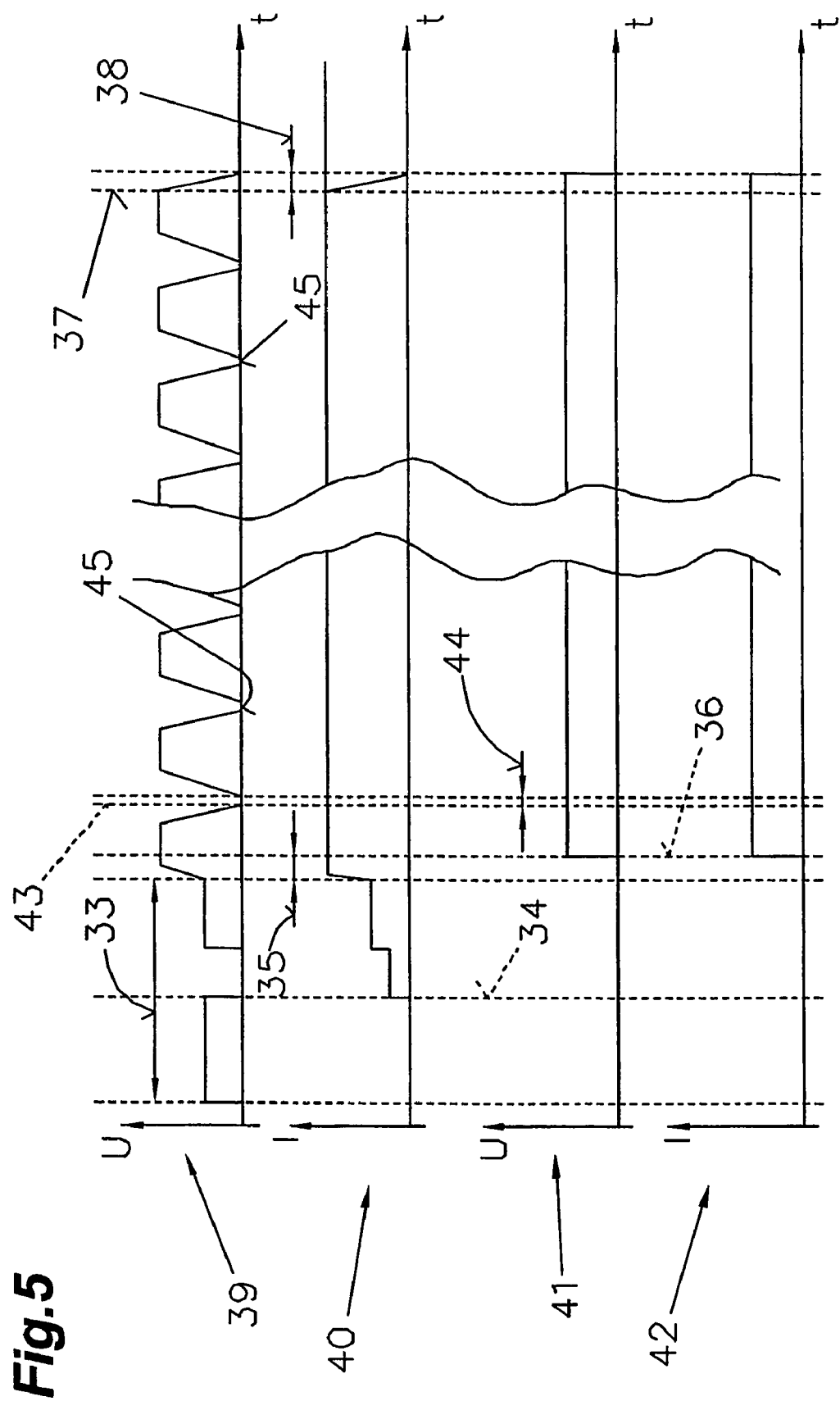

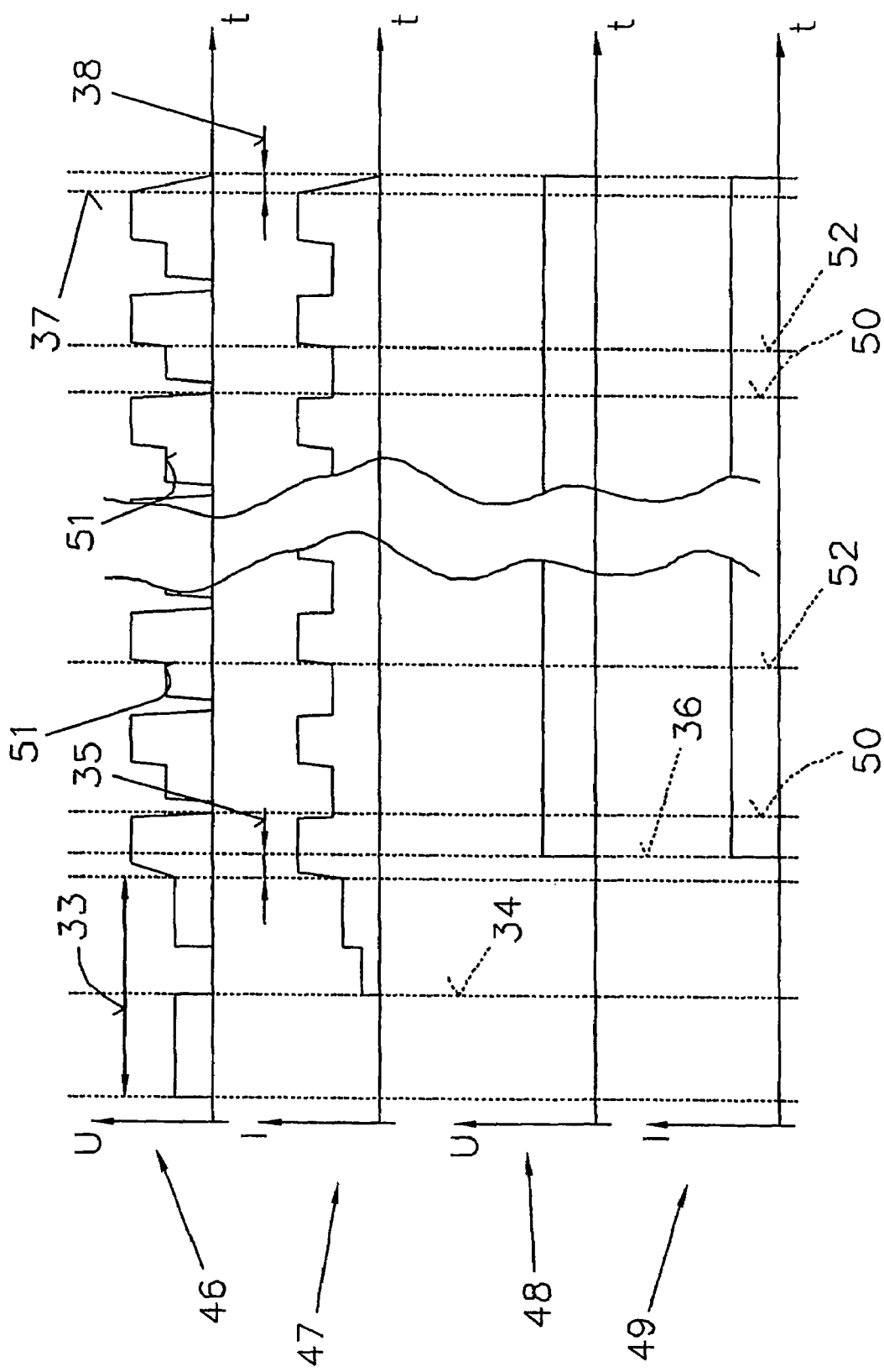

METHOD AND DEVICE FOR COMBINED LASER-ARC WELDING WITH CONTROL OF LASER UNIT ACCORDING TO WELDING TORCH

CROSS REFERENCE TO RELATED APPLICATIONS

Applicants claims priority under 35 U.S.C. §119 of Austrian Application No. A 2102/2004 filed Dec. 15, 2004. Applicants also claim priority under 35 U.S.C. §365 of PCT/AT2005/000504 filed Dec. 15, 2005. The international application under PCT article 21(2) was not published in English.

The invention relates to a method for combined laser-arc welding, wherein a laser unit for producing a laser beam and a welding torch for producing an electric arc are supplied with energy and controlled.

The invention further relates to a device for combined laser-arc welding, including a laser unit for producing a laser beam, a welding torch for producing an electric arc, a supply unit for the laser unit and a supply unit for the welding torch, and at least one control unit for controlling the laser unit and the welding torch.

The welding torch is preferably configured for carrying out a MIG (metal-inert gas)/MAG (metal-active gas) welding process.

WO 02/40211 A1 describes a laser hybrid welding head for a laser hybrid welding process, including a laser unit for producing a laser and a welding torch for producing an electric arc as well as a welding wire feeding means. So far, devices of this type have been relatively bulky and, hence, usable only as welding apparatus for robotic applications, yet not as hand-helds.

JP 2002113588 A and JP 2002103075 A describe combined laser-arc welding apparatus, which are called laser hybrid welding units. Laser hybrid welding units combine the advantages of a laser, such as rapidness and a good heat input into the work-piece, with the advantages of conventional welding methods, e.g. MIG (metal-inert gas) welding methods, such as a good gap bridging capacity.

They involve the disadvantage of requiring relatively much energy for the supply of the laser unit. In currently available combined laser-arc welding apparatus, the control of the laser unit takes place with a fixed assignment to the control of the welding torch for producing the electric arc.

The object of the present invention, therefore, consists in providing an above-mentioned method and an above-mentioned device, which enable the achievement of an optimum combination of the laser beam with the electric arc in order to ensure optimum welding results, maximum welding speeds and the highest safety possible with the minimum energy consumption possible. The drawbacks of known systems are to be avoided or reduced.

In method terms, the object of the invention is achieved in that the laser unit is controlled as a function of the welding torch. The control of the laser unit as a function of the control of the welding torch will always enable optimum adjustment to the respective requirements.

To achieve the control of the laser unit as a function of that of the welding torch, another characteristic feature of the invention contemplates that the parameters of the electric arc are monitored during the welding process and the laser unit is deactivated at a defined deviation of a parameter of the electric arc. It is, thus, ensured that the laser beam will be deactivated immediately after the extinction of the arc, which is recognized by the defined deviation of a parameter of the arc.

In the event of a non-ignited arc, it is thereby prevented that a laser beam is generated or maintained, which may lead to injury or damage, particularly with hand torches. The risk of injury by a laser beam is, in fact, increased because of the laser light being in most cases comprised of invisible infrared light. Special care must, therefore, be taken with hand torches to prevent injuries to the operating personnel or other persons by laser light.

To detect the state of the electric arc, the current of the electric arc and/or the voltage of the electric arc may be used as parameters of the electric arc.

According to a further characteristic feature of the invention, it is provided that the laser unit is deactivated at a defined deviation of the parameters of the electric arc over a predetermined period of time. Thereby, a total shutoff of the laser can be cut avoided in welding procedures in which a short-circuit of the electric arc occurs at least temporarily. In this respect, the predetermined period of time is adjusted to be longer than the duration of the short-circuit of the electric arc usually occurring in such welding processes. The laser beam will, for instance, continue to remain active at a short-circuit at which no electric arc is present, yet a current is detected. In the event that the electric arc becomes too long or is extinguished, a current or voltage threshold will be exceeded and the laser beam will be deactivated.

The above-mentioned safety is also enhanced in that the laser unit is only activated after the ignition of the electric arc, said ignition being recognized by parameters of the electric arc having attained defined values and a defined state of the electric arc having, thus, been reached. By this measure, the relatively high energy input for the production of the laser beam will be minimized, too. The laser beam will then be only activated after the ignition of an electric arc and deactivated again particularly after a defined period upon completion of the welding process, for instance a MIG welding process. With a manual welding method, for instance, the user is thus, unable to inadvertently activate the laser beam before or after the welding procedure. It is, moreover, ensured that the user places the welding torch in a position necessary for carrying out the welding process, prior to the activation of the laser beam. By measuring the power and voltage of the electric arc, it is also ensured that the welding torch is, for instance, positioned at a necessary angle relative to the workpiece, since from a particular angular deviation, i.e. if the welding torch is, for instance, tilted by the user, a longer electric arc will be drawn or formed and, hence, a defined current or voltage threshold will be exceeded and the laser beam will not be ignited or deactivated during the welding process. Thus, the safety of the laser hybrid unit is again ensured in a simple manner.

Advantageously, the laser unit is activated with a time delay after the ignition of the electric arc, in particular after having reached a defined state of the electric arc. Thereby, the safety is enhanced in a simple manner, since the laser beam cannot be activated without an ignited arc. With a manual welding torch, the risk of an undesired activation of the laser beam is, for instance, excluded, thus substantially minimizing the risk of injury by an improper handling of the manual welding torch.

It is, furthermore, advantageous if the time delay is adjustable. The time delay may, for instance, be 500 ms. The laser beam can thus be adjusted to different process states and, in particular, to different states of the electric arc.

In an advantageous manner, the power of the laser beam is adjustable as a function of the power of the electric arc. The laser power can thereby be optimally adapted to the respective conditions, for instance to the materials and thicknesses of the workpieces to be welded, while achieving optimum welding results with a minimum energy consumption. In doing so, it is to be sought, as a rule, that the laser power be substantially in correspondence with the electric arc power. For certain welding processes, it may, however, also be advantageous to reach, for instance, a deeper penetration, in which case a higher laser power relative to the arc power will be sought.

It will, therefore, be advantageous for the realization of the most diverse welding processes, if the ratio of the laser power to the arc power is adjustable.

Since the power of the electric arc depends on the welding voltage and the welding current of the welding torch for the production of the electric arc, it is advantageous if the laser power is adjustable as a function of the welding voltage and/or the welding current of the welding torch for the production of the electric arc. In this case, a control loop can be formed, in which the welding voltage and/or the welding current of the welding torch are detected and fed back to adjust the supply unit for the laser unit accordingly.

Finally, it will be of advantage if the focus of the laser beam is automatically changed as a function of the length of the electric arc. The length of the electric arc may, for instance, be determined via the welding voltage of the welding torch for the production of the electric arc, and the device for changing the focus of the laser beam can subsequently be automatically activated accordingly such that the focus of the laser beam will always be within the welding area. Besides, a correction of the focus of the laser beam is required anyway, since the latter changes with the input laser power.

The object of the invention is also achieved by an above-defined device for combined laser-arc welding, including a laser unit for producing a laser, a welding torch for producing an electric arc, a supply unit for the laser unit and a supply unit for the welding torch, and at least one control unit for controlling the laser unit and the welding torch, wherein a device for controlling the laser unit as a function of the welding torch is provided. It is thereby feasible to effect a selective activation or deactivation of the laser beam as a function of the power of the electric arc via the control device of the laser unit, which may naturally be identical with the at least one control unit for controlling the laser unit and the welding torch. The control device is, thus, also able to effectively prevent the activation of the laser beam with an unignited electric arc, which would constitute a danger and, moreover, consume a high amount of laser energy.

The device for controlling the laser unit is preferably connected with a device for detecting the welding voltage and/or the welding current of the welding torch. A control loop effecting the automatic adaptation of the laser power to the respective arc power will, thus, be realized.

To adjust the laser power as a function of the arc power, an adjustment organ is advantageously provided. The adjustment organ may be comprised of a rotary controller or a numerical keyboard for inputting a specific value or a specific ratio.

To control the adjusted values, it is advantageous if a display is provided for indicating the adjusted laser power, arc power or the like.

Furthermore, a device for the temporally delayed activation of the laser after the ignition of the electric arc may be provided. To this end, a device for the detection of the ignition of the electric arc is necessary, which may, for instance, be comprised of a measuring unit for measuring the voltage and/or current of the welding torch. Upon expiration of the defined time delay, the supply unit for the laser unit will be activated, thus turning on the laser beam.

Advantageously, a device for adjusting the time delay is provided. Said adjustment device may again be comprised of a rotary switch or a numerical keyboard for inputting specific values for the time delay.

The device for controlling the laser unit and the device for controlling the electric arc may be comprised of a digital signal processor. Such a signal processor is easily programmable and adaptable to the respective requirements.

According to a further characteristic feature of the invention, it is provided that the laser unit comprises a device for changing the focus of the laser, which is connected with a device for detecting the welding voltage of the welding torch for the production of the electric arc.

Further advantages of the present invention will be explained in more detail by way of the attached drawings, which illustrate an exemplary embodiment of the invention. Therein:

FIG. 5 is a current and voltage/time diagram of a combined laser/short-circuit welding process; and FIG. 6 is a current and voltage/time diagram of a combined laser/cold-metal transfer welding process.

Figure 1:
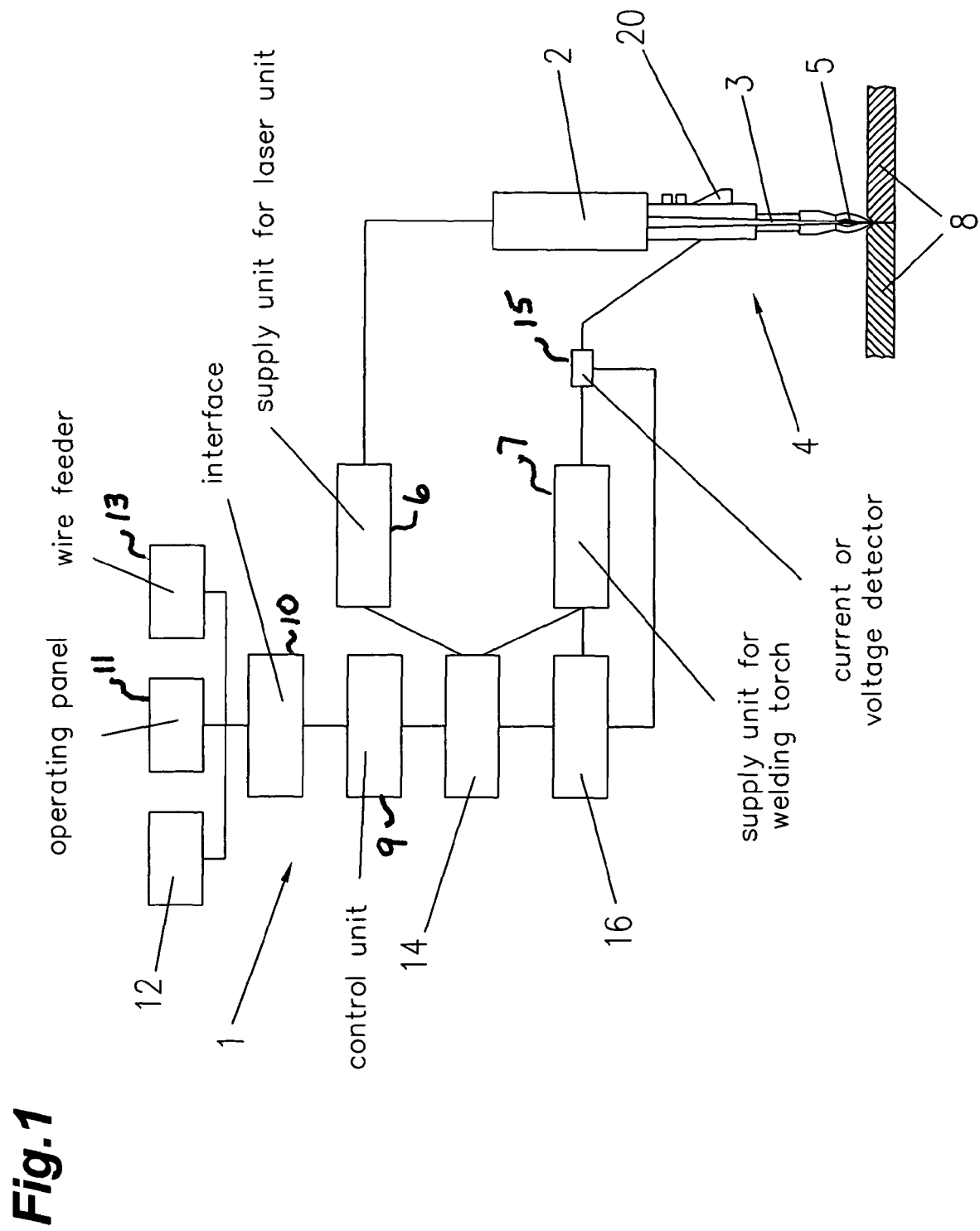
FIG. 1 is a block diagram of a device according to the invention for combined laser-arc welding.

FIG. 1 depicts, in a schematically simplified illustration, a device 1 for combined laser-arc welding, a so-called laser hybrid welding installation, comprising a laser unit 2 for producing a laser beam 3. Furthermore, the device 1 includes a welding torch 4 for generating an electric arc 5, a supply unit 6 for the laser unit 2 and a supply unit 7 for the welding torch 4, via which the energy required for the two welding processes can be adjusted. The laser hybrid welding plant, i.e. the laser unit 2 and the welding torch 4, is directed onto the junction of two workpieces 8 with the laser beam 3 preferably advancing the welding torch 4, which means that the laser beam 3 is, at first, directed onto the junction of the workpieces 8, followed by the electric arc 5, viewed in the welding direction.

The welding torch 4 may be selected from any type of welding torch for any type of welding process, it being, however, preferred to carry out a MIG/MAG welding process. A control device 9 is advantageously provided to control the laser unit 2 and the welding torch 4 and to control, yet also operate and monitor, the welding device 1. An interface 10 serves to connect with the welding device 1 an operating panel 11, a remote control 12 and, for instance, a wire feeder 13. In accordance with the invention, a device 14 is provided to control the laser unit 2 as a function of the welding torch 4. In this case, the control device 14, which may, for instance, be comprised of a digital signal processor, is advantageously directly connected with the supply unit 6 for the laser unit 2 and the supply unit 7 for the welding torch 4. This enables the adjustment of the ratio of the power $P_{laser}$ of the laser beam 3 to the power $P_{arc}$ of the electric arc 5 via the control device 14. Depending on the required conditions, it is, thus, feasible to, for instance, achieve a deeper penetration into the junction of the workpieces 8 by the laser beam 3. This will substantially enhance welding by the subsequent arc welding process, since the subsequent welding process is able to act more profoundly into the junction of the workpieces 8 with less power. The supply units 6 and 7 may, of course, also be comprised of a common unit. The power $P_{laser}$ input into the workpiece 8 by the supply unit 6, or energy of the laser beam 3, is adapted to the respective power $P_{arc}$, or energy of the supply unit 7 of the electric arc 5, and controlled accordingly.

The device 14 for controlling the laser unit 2 can be connected with a device 15 for detecting the welding voltage U and/or the welding current I of the welding torch 4, optionally via an analog/digital converter 16, to form a control loop. Such a feedback enables the automatic adaptation of the laser power $P_{laser}$ of the laser beam 3 to the arc power $P_{arc}$ of the electric arc 5.

Usually, the laser unit 2 comprises a device for changing the focus of the laser beam 3, which may be connected with the device 15 for detecting the welding voltage of the welding torch 4. As illustrated, it is feasible to establish the connection via the device 14 for controlling the laser unit 2. This enables the detection of the length of the electric arc 5 via the welding voltage U so as to subsequently adapt the focus of the laser 3 to this detected length of the electric arc 5. The input energy can, thus, be minimized by optimally adjusting the laser focus. The device 14 for controlling the laser unit 2 may further comprise a device for the temporally delayed activation of the laser 3 after the ignition of the electric arc 5. This time delay is advantageously adjustable via adjustment organs provided, for instance, on the operating panel 11 or on the control device 14.

The parameters of the electric arc 5 used to detect the states of the electric arc are detected by the device 15 for detecting the welding voltage U and/or the welding current I of the welding torch 4, and transmitted to the device 14 for controlling the laser unit 2. In an advantageous manner, parameters of the electric arc 5, for instance the arc current I and/or the arc voltage U, are monitored during the welding process. This helps recognize defined deviations of one or more parameter(s) of the electric arc 5 and subsequently control the laser unit 2 accordingly. In this manner, it is, for instance, possible to recognize an extinction of the electric arc 5, or a short-circuit of the electric arc 5, whereupon the laser unit 2 will be deactivated and the laser beam 3 will, thus, be extinguished. In short-circuit-afflicted welding processes, a short-term short-circuit of the electric arc 5 does, however, occur deliberately or intentionally and should not lead to an automatic deactivation of the laser unit 2. To this end, a time period 38 (cf. FIGS. 4-6) can be defined such that, at the occurrence of a short-circuit, said time period 38 is started with the laser unit 2 remaining active during the short-circuit within said time period 38, and the laser unit 2 will only be deactivated when the time period 38 is exceeded and the short-circuit prevails. The time period 38 is dimensioned longer than the usual duration of the short-circuit in a short-circuit-afflicted welding process.

If too long an electric arc 5 is drawn, either the welding current I or the welding voltage U of the electric arc 5 will rise. This may be due to various reasons, for instance, by too far a movement of the welding torch 4 away from the workpieces 8 or by a change of the angle of the welding torch 4 relative to the workpieces 8. At a defined deviation of a defined parameter of the electric arc 5, the laser unit 2 will then be deactivated by the control device 14.

It is thereby ensured that the laser beam 3 does not pose any risk of injury. If, for instance, the welding torch 4 is twisted, i.e. the angle of the welding torch 4 relative to the workpieces 8 is changed, it might happen that the laser beam 3 would burn beyond the workpieces 8 and, hence, injure persons standing about or damage appliances arranged nearby. Since the electric arc 5 becomes longer and changes its parameters at an angular change, the laser beam 3 can be automatically deactivated by the detection of the parameters of the electric arc 5.

After the extinction of the electric arc 5, the laser beam 3 will be immediately turned off so as to enable the user to lay the welding torch 4 with the laser unit 2 aside upon completion of the welding process, without inadvertently activating the laser beam 3. The detection device 15 may also be combined with a short-circuit recognition so as to prevent the laser beam 3 from being deactivated at a short-circuit of the electric arc 5 as occurs in a short-circuit welding process. In short-circuit welding processes, a further penetration into the workpiece 8 by the laser jet 3 may consequently take place during the short-circuit.

The device 15 can also be used to detect the ignition of the electric arc 5 so as to turn on the laser beam 3 only after the ignition of the electric arc 5. The laser beam 3 can be turned on after a predefined time delay in order to prevent improper handling of the welding torch 4 with the laser unit 2 and, hence, ensure the greatest safety possible. It is, thus, safeguarded in a simple manner that the laser beam 3 will not be activated without an ignited arc 5 such that risks of injury or damage by a inadvertently activated laser beam 3 will be excluded.

Figure 2:
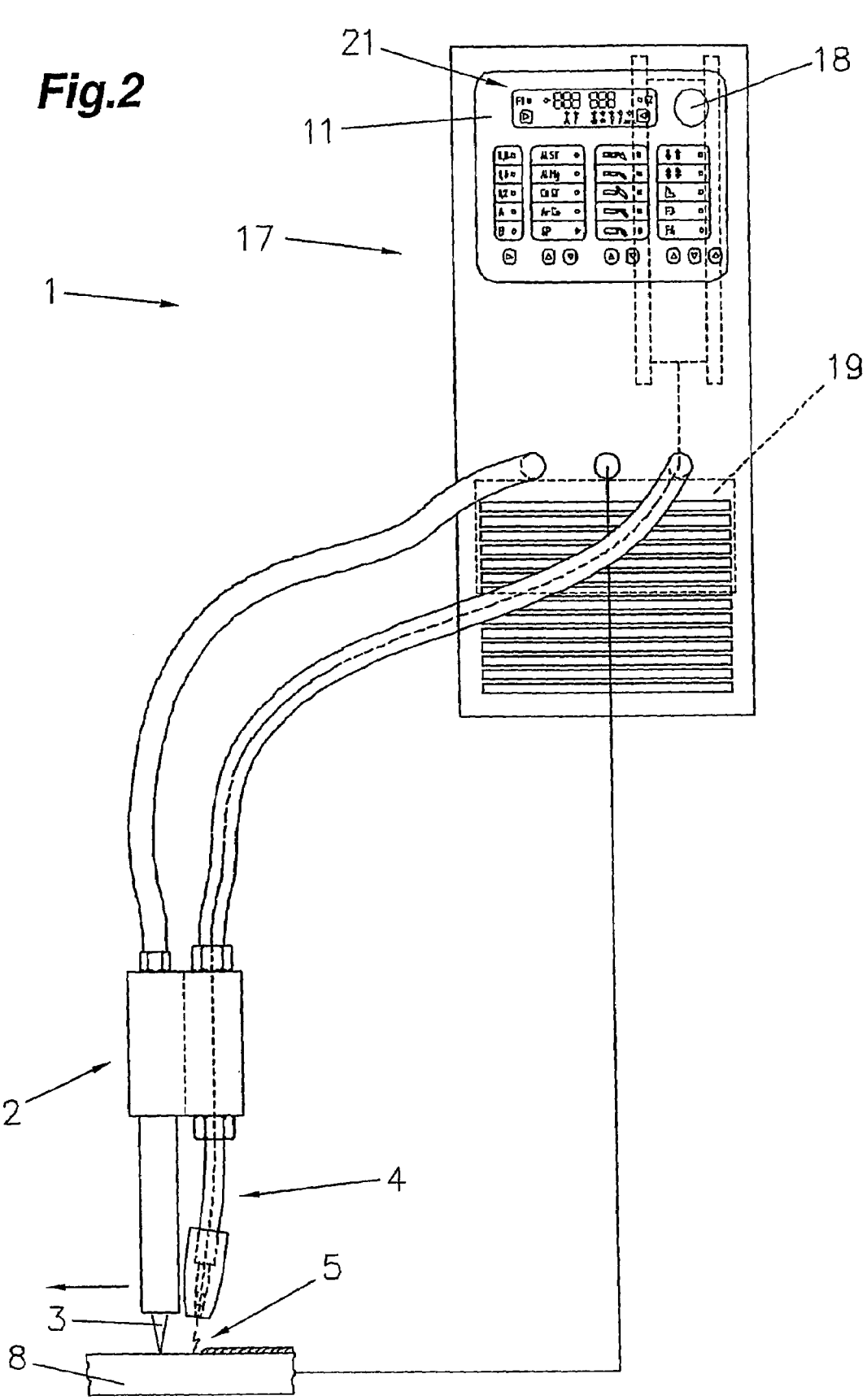
FIG. 2 depicts a welding apparatus comprising the device according to the invention for combined laser-arc welding.

FIG. 2 schematically illustrates a welding device 17 including an operating panel 11. The energy can be controlled by the user through an adjustment organ 18 arranged on the operating panel 11 and, in particular, a rotary controller. The adjustment organ 18 can also be arranged on a remote control 12, which is not illustrated in this exemplary embodiment.

In the exemplary embodiment illustrated, both the laser beam 3 and the electric arc 5 are supplied by common welding current source 19 arranged within the welding device 17. It is, of course, also possible that one or even several welding current sources 19 are each arranged for the two units in the welding device 17 or outside the welding device 17. After having turned on the welding device 17 and actuated a torch button 20 provided on the welding torch 4 and depicted in FIG. 1, the welding current source 19 supplies energy for both welding methods. It is, thus, feasible to feed, for instance, the electric arc 5 with constant energy, while the power of the laser beam 3 can be controlled according to the user's requirement. Naturally, also the laser beam 3 can be constantly powered with energy while the electric arc 5 is adapted to the respective requirements.

In doing so, it is also feasible to control the laser power $P_{laser}$ of the laser beam 3 and the arc power $P_{arc}$ of the electric arc 5 at a relative ratio, preferably via a single adjustment organ 18. The welding current source 19 will, thus, supply the required energy while enabling the control of the performances of the two welding methods by the aid of the single adjustment organ 18 as a function of the respective requirement and/or nature of the workpieces 8.

This ensures optimum welding results with minimum energy consumptions. As a rule, it is to be aimed at the laser power $P_{laser}$ substantially corresponding to the arc power $P_{arc}$. For certain welding processes it may, however, also be advantageous to reach, for instance, a deeper penetration into the workpieces 8, for which reason a laser power $P_{laser}$ higher than the arc power $P_{arc}$ is sought.

If, for instance, the laser power $P_{laser}$ is increased relative to the arc power $P_{arc}$, a deeper penetration into the workpieces 8 will be achieved in the welding process by the laser beam 3. The electric arc 5, on account of the power reduced relative to the laser beam 3, will only fill the gap between the workpieces 8. A big advantage of a higher power $P_{laser}$ of the laser beam 3 is that the welding speed can be substantially increased without remarkable quality losses. Naturally, also the focus of the laser beam 3 can be adjusted so as to be, for instance, located in the center of the thickness of the workpieces 8. It is, thus, possible to merely change the focus of the laser beam 3 rather than its power. With a reduced power $P_{laser}$ of the laser beam 3, a smaller penetration of the laser beam 3 into the workpieces 8 is effected, thus resulting in an enhanced gap bridging ability by the electric arc on account of the available melt bath and, hence, in the creation of a secure, improved and perfect, or near-perfect, weld.

For carrying out the most diverse welding processes, it will, therefore, be advantageous if the ratio of the laser power $P_{laser}$ to the arc power $P_{arc}$ is adjustable. In doing so, it is advantageous that the adjustment of the ratio of the laser power $P_{laser}$ to the arc power $P_{arc}$ by the aid of, for instance, just a single adjustment organ 18 provides simple operation, with the user being able to effect an appropriate change of the power of both energy sources merely by a single adjustment.

Figure 3:
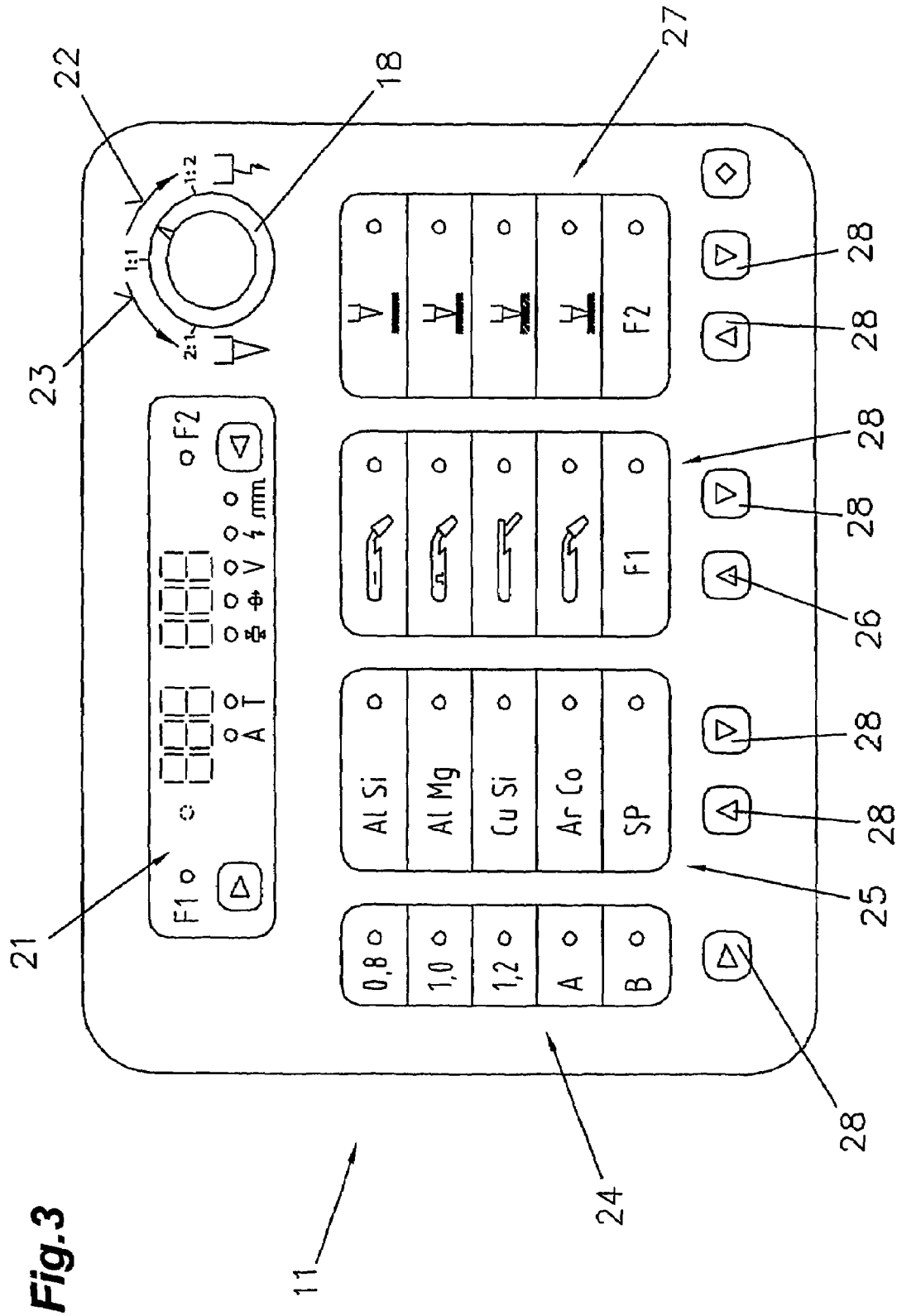
FIG. 3 illustrates an operating panel of the welding apparatus according to FIG. 2.

FIG. 3 depicts the operating panel 11 of the welding apparatus according to FIG. 2. The operating panel 11 and/or the remote control 12 may include a display 21, on which the adjusted power values of the laser beam 3 and the electric arc 5 are indicated so as to be readable by the user.

The ratio of the power of the laser beam 3 to that of the electric arc 5 can be adjusted via the adjustment organ 18. The laser power $P_{laser}$ can, thus, for instance, be reduced relative to the arc power $P_{arc}$ (arrow 22) in order to cause a less deep penetration of the laser beam 3 in the junction of the workpieces 8 and, hence, melting of the workpieces 8. Since, on the other hand, the power $P_{arc}$ of the electric arc 5 is adjusted to be accordingly higher, based on the power $P_{laser}$ of the laser beam 3, an enhanced gap bridging ability will, for instance, be achieved. Similarly, an accordingly higher power $P_{laser}$ of the laser beam 3 can be applied (arrow 23), based on the power $P_{arc}$ of the electric arc 5, so as to effect a substantially larger penetration of the laser beam 3, the electric arc 5 lagging behind the laser beam 3 placing a weld over the juncture of the workpieces 8 with less power. A big advantage of a higher power $P_{laser}$ of the laser beam 3 consists in that it allows for a substantial increase in the welding speed without remarkable quality losses.

On the operating panel 11, further adjustment options may be provided for the laser beam 3 and the electric arc 5. It is, for instance, possible to select the diameter of the filler material of the subsequently employed welding process by simply actuating a key switch 28 and indicate it on a display 24. Furthermore, the material of the employed filler material can be adjusted and represented on a display 25, the welding process lagging behind can be adjusted and indicated on a display 26, and the focus of the laser beam 3 can be adjusted and indicated on a display 27. By actuating the key switches 28, the values desired for the laser hybrid welding process can, thus, be fixed in a simple manner.

It is thereby feasible for the user to select the optimum welding method, in particular the optimum laser hybrid welding process, for the workpieces 8 to be welded. For instance, in order to regulate and, in particular, minimize the warpage of the workpieces 8, a cold-metal transfer welding process can be combined with the laser welding process. It goes without saying that any other current welding process is adjustable in combination with the laser welding process.

Figure 4:
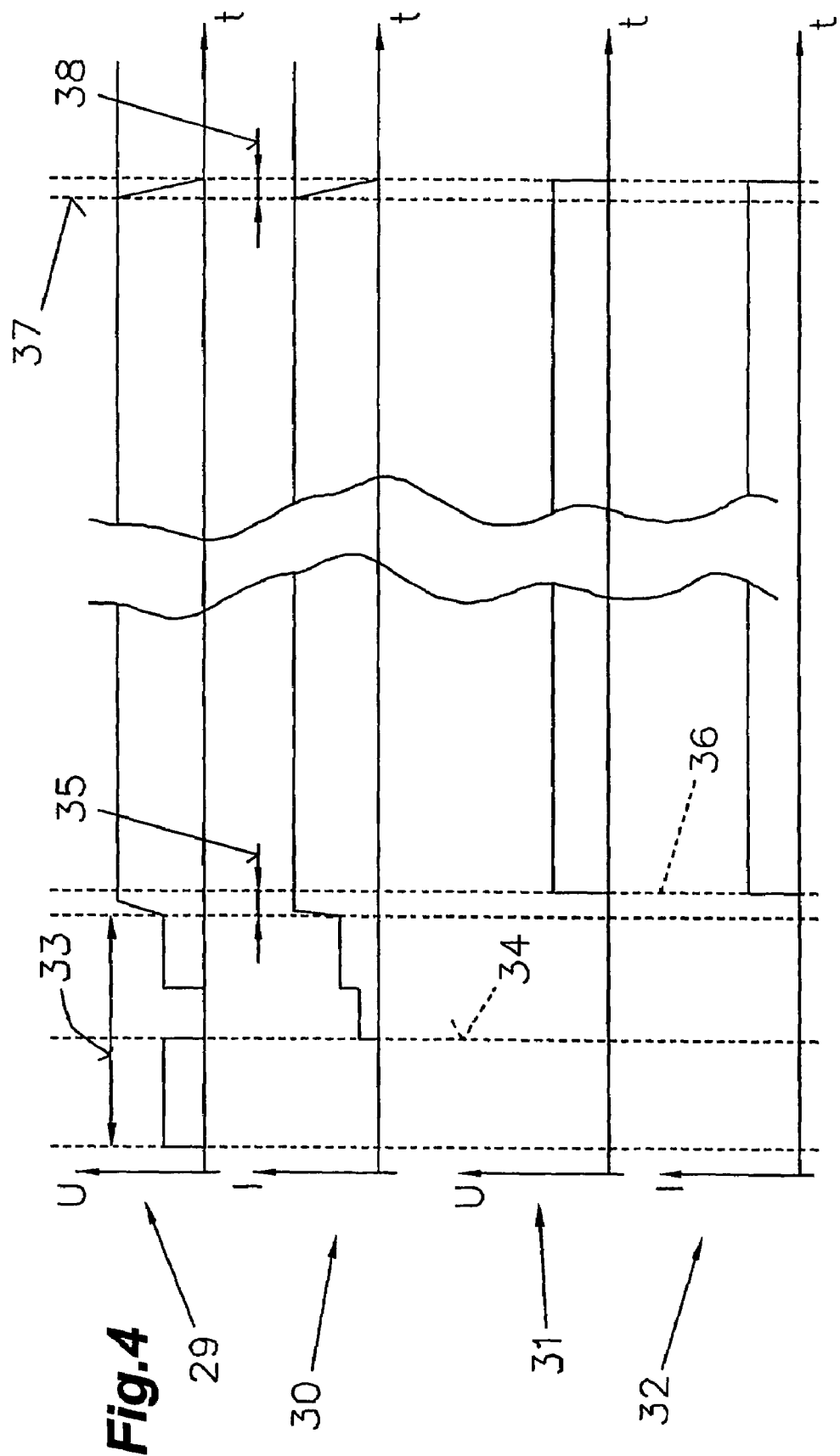
FIG. 4 is a current and voltage/time diagram of a combined laser/pulse welding process.

FIG. 4 depicts a voltage/time diagram 29 and a current/time diagram 30 of a MIG welding process as well as a voltage/time diagram 31 and a current/time diagram 32 of the laser welding process. In the welding method combined according to the invention to provide a laser welding process, the so-called "lift-arc principle" is, for instance, used to ignite the electric arc 5 during the ignition phase 33. In doing so, a filler material, in particular a welding wire, is advanced until contacting the workpieces 8, and the movement of the welding wire is subsequently reversed and the welding wire is returned to a predefined distance from the workpiece 8, and the movement of the welding wire is reversed again. By feeding the welding wire from a time 34 of the short-circuit with a defined current I, which is selected to prevent the welding wire from melting, the ignition of the electric arc 5 takes place during the rearward movement and lifting of the welding wire. After the ignition of the electric arc 5, the laser beam 3 can be activated at time 36 after a predefined temporal delay 35. The laser unit 2 is, thus, activated with a time delay 35 after the ignition of the electric arc 5. On the one hand, this will further enhance the safety by avoiding any risk of injury by a laser beam 3 that is activated too early and, on the other hand, this will reduce the energy input required for the production of the laser beam 3. In addition, the laser beam 3 will only be activated with a surely ignited electric arc 5. This measure ensures that the laser beam 3 will only be turned on upon expiration of the defined time delay 35 of the ignition of the electric arc 5 so as to safeguard that a welding process has actually been started and the laser hybrid welding torch has, thus, been used properly.

The time delay 35 is advantageously adjustable and may, for instance, be 500 ms. It is also feasible to detect the parameters of the electric arc 5 and transmit them to the control device 14 to control the laser beam 3 accordingly. The laser beam 3 can, thus, only be ignited upon reaching of a defined state of the electric arc 5.

At the completion of the welding process according to time 37, the detection device 15 recognizes the absence of the current I and/or the absence of the voltage U of the electric arc 5. This is passed on to the device 14, which stops the energy supply to the laser unit 2. The automatic deactivation of the laser beam 3 is, thus, ensured irrespectively of whether the electric arc 5 has been terminated deliberately of whether the user has inadvertently lifted off the workpiece 8 the welding torch 4 with the laser unit 2 during manual welding to such an extent that the electric arc 5 is extinguished. The safety is thereby greatly enhanced, since the laser beam 3 will only be activated with an existing electric arc 5 and will, moreover, be deactivated again at an unintentional or even intentional termination of the welding process after an adjustable time 38 so as to prevent any improper handling of the welding torch 4 with the laser unit 2.

FIG. 5 depicts a voltage/time diagram 39 and a current/time diagram 40 of a pulse welding method as well as a voltage/time diagram 41 and a current/time diagram 42 of the laser 3.

After the ignition phase 33, which is again effected according to the lift-arc principle, a pulse welding process is started at time 36 after a time difference 35.

In the pulse welding process, a movement of the welding wire in the direction of the workpiece 8 until contacting the work-piece 8 is effected following the ignition phase 33. At time 43, a short-circuit is generated, which is why no electric arc 5 is present. The duration of the short-circuit or period 44 until the reignition of the electric arc 5 is, however, very short in this method. In the pulse welding method, the laser beam 3 will continuously remain active, i.e. even during the short-circuit or time period 44. This is achieved in that a time period 38 is preset, over which the short-circuit must prevail before the laser unit 2 is deactivated. After having recognized the short-circuit at time 43 after the extinction of the electric arc 5 and, hence, a drop of the voltage U to a zero value 45, the laser unit 2 will only be activated if the voltage U remains at the zero value 45 for a pregiven time period 38. In the short-circuit welding method, the time period 38 until the laser beam 3 is shut off the device 14 triggered by the device 15, thus, has to be construed to be longer than the time period 44 of the short-circuit until the electric arc 5 is reignited. The time period 38 until the deactivation of the laser beam 3 is, however, chosen such that as little time as possible will elapse after the actual completion of the welding process so as to again ensure the greatest safety possible when using the welding torch 4 with the laser unit 2. The time period 38 may, for instance, range between 0.5 and 2 seconds. This has advantages, particularly in the field of manual welding, in that the user need not fear any injuries or injuries to other persons, or damage to objects lying about, by the laser beam 3 during improper handling.

It is also possible that no signal is transmitted to the device 14 by the device 15 upon recognition of the short-circuit so as not to deactivate the laser beam 3 during the short-circuit period 44. This allows for another shortening of the period 38 until the deactivation of the laser beam 3, which will lead to an even more enhanced safety of the laser hybrid unit according to the invention.

FIG. 6 depicts a voltage/time diagram 46 and a current/time diagram 47 of a cold-metal transfer welding process as well as a voltage/time diagram 48 and a current/time diagram 49 of the laser beam 3.

The cold-metal transfer welding process is again started by the above-described lift-arc ignition during the ignition phase 33. Upon ignition of the electric arc 5, the laser beam 3 is activated at time 36 after a time delay 35.

During the cold-metal transfer welding process, the filler material, particularly the welding wire, is moved from a starting position in the direction of the workpieces 8. After the welding wire has contacted the workpieces 8, thus forming a short-circuit at time 50, the wire feed is reversed and the welding wire is preferably returned to its starting position. In order to ensure droplet formation or melting of the welding wire during the cold-metal transfer welding process, the welding current I is increased relative to a base current 51 at time 52 during the advance movement of the welding wire in the direction of the workpieces 8. Due to the immersion of the welding wire in the melt bath and the subsequent rearward movement of the welding wire, the droplet or melted material is detached from the welding wire (not illustrated). To promote droplet detachment, a pulse-like increase in the welding current I may also be effected.

The advantage of the combination of a laser welding method with a cold-metal transfer welding process resides in that substantially less energy and heat are introduced into the workpieces 8 by the cold-metal transfer welding process. As a result, the warpage of the workpieces 8 will, for instance, be advantageously minimized, since the cold-metal transfer welding process is a so-called cold welding process.

The invention claimed is:

1. A device for combined laser-arc welding, comprising a laser unit for producing a laser beam at a selected laser beam power, a manual welding torch for producing an electric arc at a selected electric arc power, a first energy supply unit for supplying energy to the laser unit and a second energy supply unit for supplying energy to the welding torch, at least one control unit for controlling the laser unit and the welding torch, a control device for controlling the laser unit as a function of the welding torch, a detector for detecting the welding voltage and/or the welding current of the welding torch connected with the control device, a device for the temporally delayed activation of the laser beam after ignition of the electric arc, and an adjustment member for adjustment of the laser beam power as a function of the electric arc power.

2. The device according to claim 1, further comprising at least one display for indicating the adjusted laser power, arc power or the like.

3. The device according to claim 1, further comprising a device for adjusting the time delay.

4. The device according to claim 1, wherein the control device comprises a digital signal processor for controlling the laser unit and the electric arc.

5. The device according to claim 1, wherein the laser unit comprises a device for changing the focus of the laser beam, which is connected with the detector.

6. A method for combined laser-arc welding using a manual welding torch comprising the steps of:
(a) supplying a laser unit for producing a laser beam and a welding torch for producing an electric arc with energy;
(b) monitoring parameters of the electric arc during a welding process;
(c) controlling the laser unit as a function of the welding torch to activate the laser unit only after ignition of the electric arc with a time delay, the ignition being recognized by parameters of the electric arc having attained defined values; and
(d) deactivating the laser unit at a defined deviation of the parameters of the electric arc over a predetermined period of time.

7. The method according to claim 6, wherein the arc current and/or the arc voltage are monitored.

8. The method according to claim 6, wherein the time delay is adjustable.

9. A method according to claim 6, wherein the laser power of the laser beam is adjustable as a function of the power of the electric arc.

10. The method according to claim 9, wherein the laser power is adjustable in proportion to the power of the electric arc.

11. The method according to claim 6, wherein laser power of the laser beam is adjustable as a function of the welding voltage and/or the welding current of the welding torch for producing the electric arc.

12. The method according to claim 6, wherein the focus of the laser beam is automatically changed as a function of the length of the electric arc.

* * * * *

UNITED STATES PATENT AND TRADEMARK OFFICE
CERTIFICATE OF CORRECTION

PATENT NO.         : 7,759,603 B2
APPLICATION NO.    : 11/791375
DATED              : July 20, 2010
INVENTOR(S)        : Aigner et al.

Page 1 of 1

It is certified that error appears in the above-identified patent and that said Letters Patent is hereby corrected as shown below:

In Column 10, line 41, please change "A" to correctly read:    --The--.

In Column 10, line 41, after the word "wherein" please delete:    "the".

Signed and Sealed this

Thirty-first Day of August, 2010

David J. Kappos
*Director of the United States Patent and Trademark Office*